United States Patent
Usami

(10) Patent No.: US 6,731,592 B2
(45) Date of Patent: May 4, 2004

(54) OPTICAL INFORMATION RECORDING MEDIUM AND METHOD OF MANUFACTURING OPTICAL INFORMATION RECORDING MEDIUM

(75) Inventor: Yoshihisa Usami, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 135 days.

(21) Appl. No.: 09/956,798

(22) Filed: Sep. 21, 2001

(65) Prior Publication Data

US 2002/0034155 A1 Mar. 21, 2002

(30) Foreign Application Priority Data

Sep. 21, 2000 (JP) .................................. 2000-287348

(51) Int. Cl.[7] .................................................. G11B 7/24
(52) U.S. Cl. ................................................... 369/286
(58) Field of Search ................... 369/286, 283, 369/288

(56) References Cited

U.S. PATENT DOCUMENTS

| | | | | |
|---|---|---|---|---|
| 5,126,180 A | * | 6/1992 | Gotoh et al. ............... | 428/64.4 |
| 5,260,435 A | * | 11/1993 | Sawada et al. .............. | 540/122 |
| 5,479,555 A | * | 12/1995 | Rot et al. .................... | 385/145 |
| 5,481,530 A | * | 1/1996 | Ueda et al. ............... | 369/275.1 |
| 5,645,907 A | * | 7/1997 | Kim et al. .................. | 428/64.1 |
| 6,245,403 B1 | * | 6/2001 | Spahni et al. ............... | 428/64.1 |
| 6,269,072 B1 | * | 7/2001 | Ohgo .......................... | 369/286 |
| 6,309,794 B1 | * | 10/2001 | Hayashi et al. ......... | 430/270.12 |

FOREIGN PATENT DOCUMENTS

| | | |
|---|---|---|
| EP | 0 307 081 A2 | 3/1989 |
| EP | 0 395 369 A2 | 10/1990 |
| EP | 0 875 888 A1 | 11/1998 |
| EP | 0 994 470 A2 | 4/2000 |
| GB | 2 331 176 | 5/1999 |
| JP | 2-300288 | 12/1990 |
| JP | 3-224793 | 10/1991 |
| JP | 4-146189 | 5/1992 |
| JP | 2000-123411 | 4/2000 |

\* cited by examiner

Primary Examiner—Brian E. Miller
(74) Attorney, Agent, or Firm—Sughrue Mion, PLLC

(57) ABSTRACT

An optical information recording medium of the present invention is structured by a disk-shaped transparent substrate in which a center hole is formed in a central portion thereof, a light reflecting layer, a dye recording layer containing an organic dye, an intermediate layer, an adhesive layer, and a thin protective layer. The light reflecting layer, the dye recording layer, and the intermediate layer are provided on a region of the transparent substrate at which a pre-groove is formed. The thin protective layer is provided on the intermediate layer via the adhesive layer which is formed of a photocurable resin which is cured by light of a wavelength other than a main absorption band of a recording layer dye.

4 Claims, 8 Drawing Sheets

F I G. 1
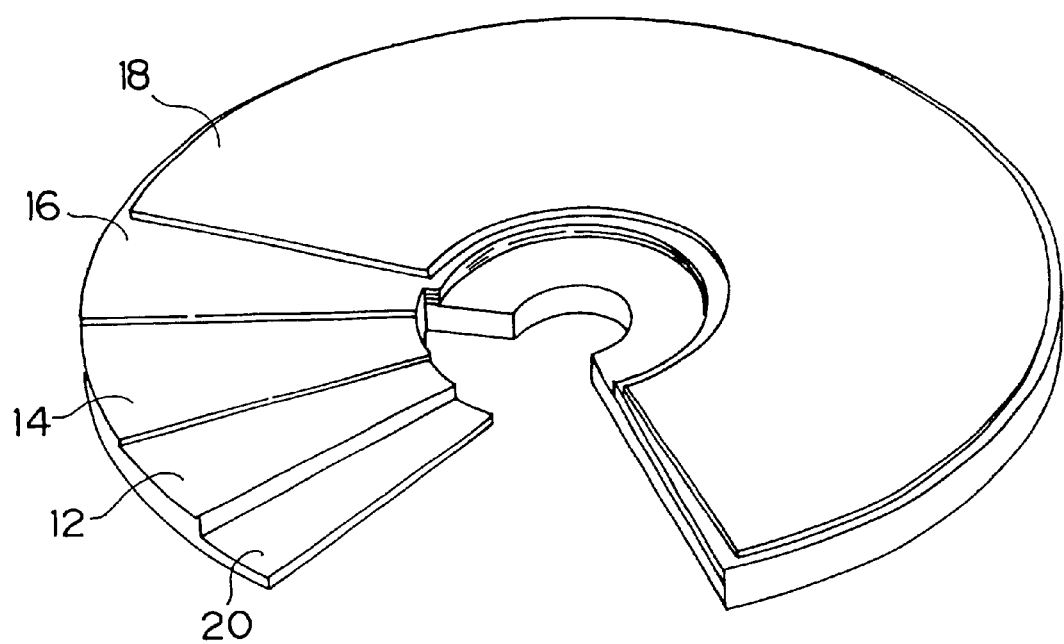

F I G. 2
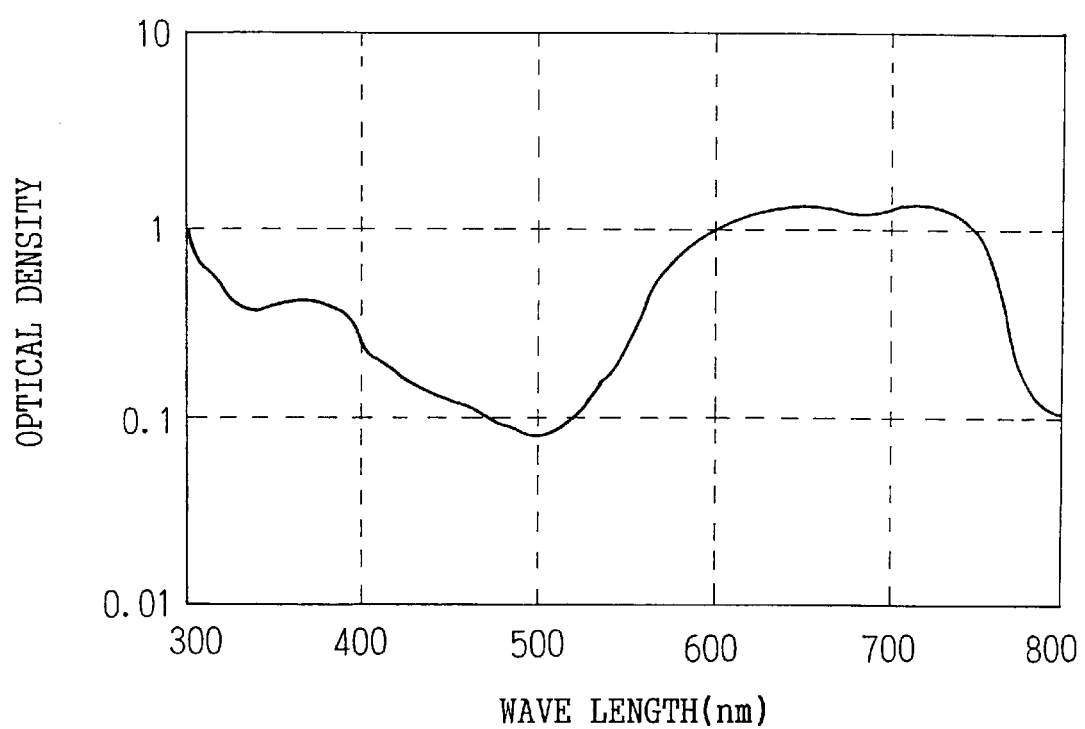

F I G. 3
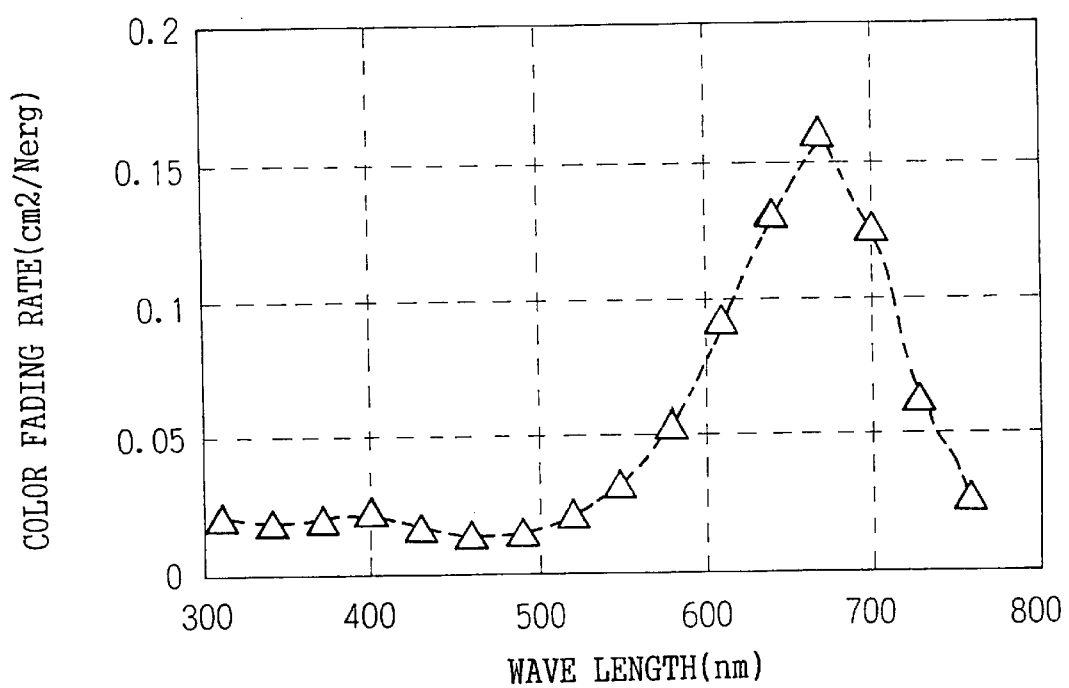

F I G. 5
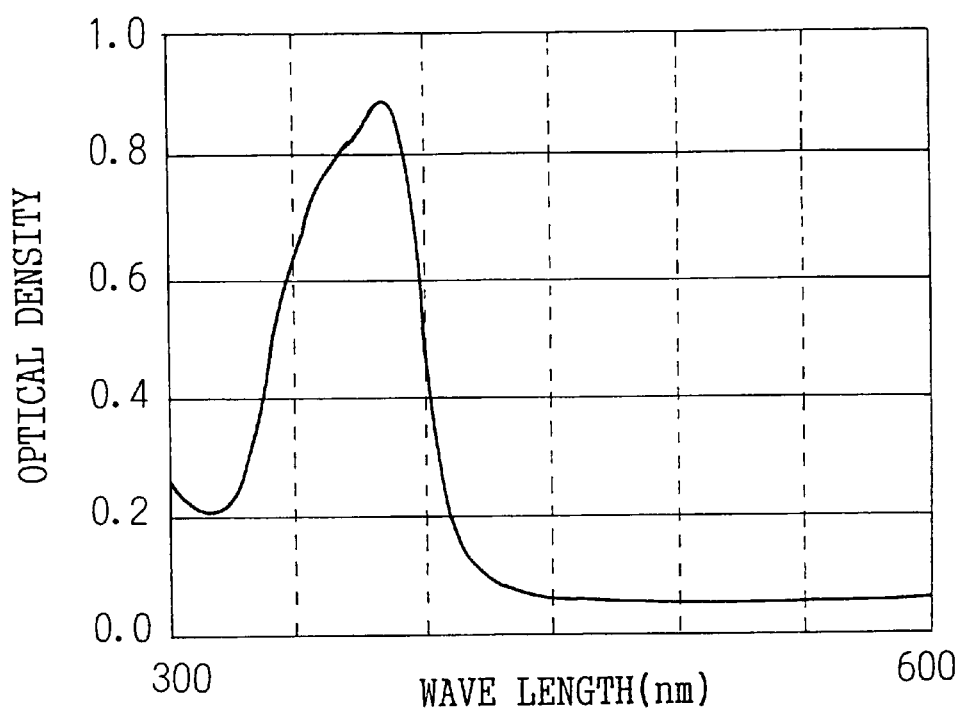

F I G. 6
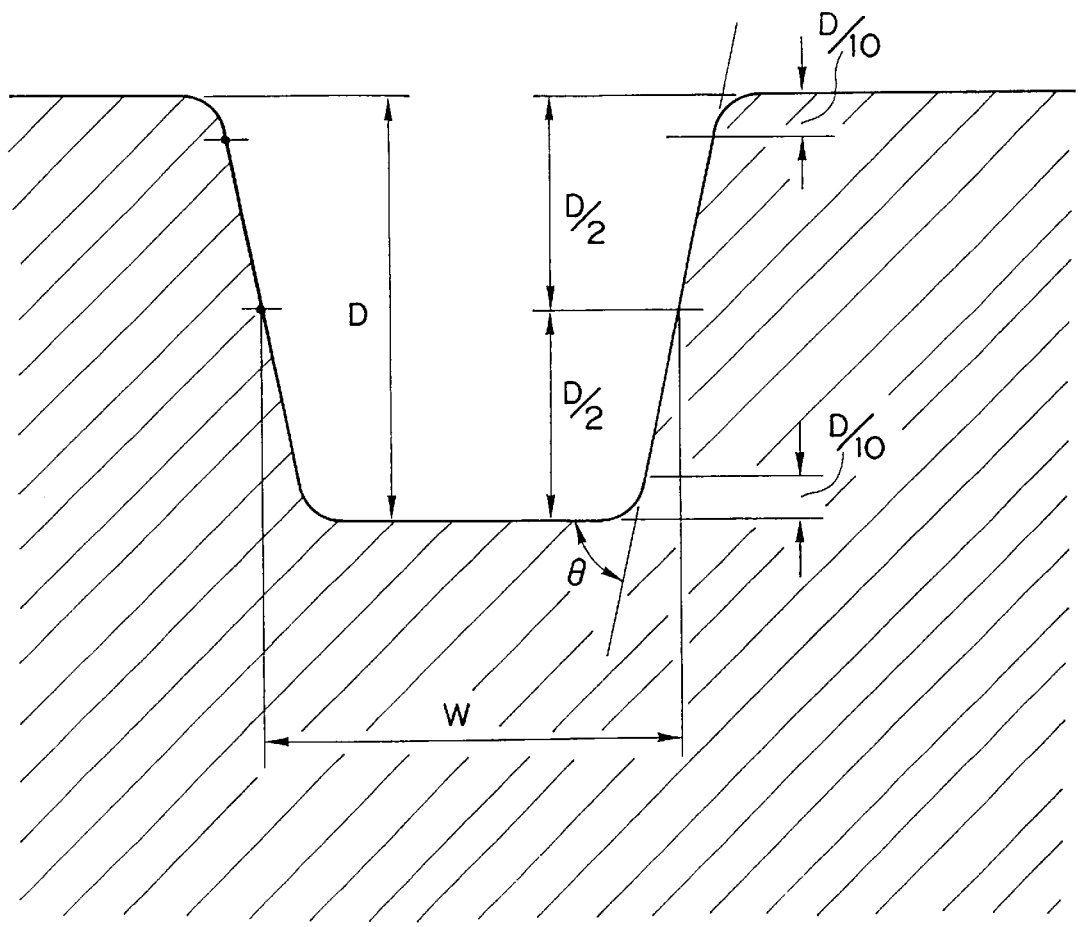

OPTICAL INFORMATION RECORDING MEDIUM AND METHOD OF MANUFACTURING OPTICAL INFORMATION RECORDING MEDIUM

BACKGROUND OF THE INVENTION

1. Field of the Invention

The present invention relates to an optical information recording medium and a method of manufacturing an optical information recording medium, and in particular to an optical information recording medium provided with a recording layer containing a dye and a photocured layer formed by photocuring a photocurable resin, and to a method of manufacturing the optical information recording medium.

2. Description of the Related Art

Conventional writable optical information recording media (optical disks), on which it is possible to record information a single time by laser light, are called CD-Rs and are well known. A representative structure of a CD-R type optical information recording medium is a structure in which a dye recording layer formed from an organic dye, a light reflecting layer formed from a metal such as gold, and a protective layer formed of resin, are layered in that order on a transparent, disk-shaped substrate. Recording of information onto the optical disk is carried out by irradiating near infrared laser light (usually laser light of a wavelength in a vicinity of 780 nm) onto the optical disk. The illuminated portions of the dye recording layer absorb the light such that the temperature at these portions rises. The optical characteristics of these portions change due to the physical or chemical change (e.g., the formation of pits or the like), whereby information is recorded. On the other hand, playback of information is usually carried out by irradiating, onto the optical disk, laser light of the same wavelength as that of the laser light used for recording, and detecting the differences in the reflectances of the regions (recorded regions) of the dye recording layer at which the optical characteristics have changed and the regions (unrecorded regions) at which the optical characteristics have not changed.

Recently, writable optical disks called DVD-Rs have been put into practice as media which enable recording at a higher density than CD-Rs, and as such are rising in rank as large-capacity recording media. DVD-Rs usually have a structure in which two disks, each formed by a dye recording layer formed from an organic dye, a light reflecting layer, and a protective layer layered in that order on a transparent disk-shaped substrate, are adhered together by an adhesive with their dye recording layers at the inner sides thereof. Alternatively, a DVD-R has a structure in which the aforementioned disk and a disk-shaped protective substrate of the same configuration are adhered together by an adhesive with the dye recording layer at the inner side.

Generally, a photocurable resin such as a UV-curing resin or the like is used in the aforementioned formation of the protective layer and adhering of the disks. At the time that light is irradiated onto the photocurable resin and the resin is photocured, when the light is irradiated at the same time onto the dye recording layer as well, there is the concern that the dye contained in the recording layer may partially decompose such that the recording characteristics deteriorate. However, conventional CD-Rs and DVD-Rs have a structure in which a layer for blocking light, such as a light reflecting layer, is provided between the layer to be photocured and the dye recording layer. Thus, light is not directly irradiated onto the dye recording layer, and the problem of deterioration in recording characteristics does not occur.

Due to the development of laser technology in recent years, short wavelength lasers such as blue lasers and the like have come to be put into practice. Accordingly, the development of novel optical information recording media, at which recording can be carried out at a high density by light of a wavelength of about 450 nm which is shorter than conventional recording wavelengths (of 780 nm or 630 nm), has progressed. Generally, the more the beam diameter of the irradiated laser light is made small, the more high density recording is possible. In order to decrease the beam diameter, the dye recording layer must be formed at a more shallow position from the surface. Thus, in an optical information recording medium for short wavelengths, a thin protective layer is provided at the side opposite a substrate of a predetermined thickness (1.2 mm in a CD-R), and recording is carried out by light being irradiated from the thin protective layer side.

However, when attempts are made to provide the thin protective layer at the side opposite the substrate, the light reflecting layer, the dye recording layer, and the thin protective layer are formed in that order on the substrate. When light is irradiated onto the photocurable resin and the resin photocures and the thin protective layer is formed, light is irradiated onto the dye recording layer as well at the same time. Namely, in the structure of an optical recording medium for short wavelengths, a problem arises in that, at the time of manufacture, the dye contained in the recording layer partially decomposes, and the recording characteristics deteriorate.

Further, in conventional CD-Rs and DVD-Rs, in order to prevent scratches from being formed in the substrate surface which is the surface on which the recording light and playback light are incident, the proposal has been made to provide a hard-coat layer, which is very hard and is formed from a photocurable resin, on the substrate surface. However, in this case as well, when light is irradiated onto the photocurable resin and the resin is photocured and the hard-coat layer is formed, light is irradiated onto the dye recording layer as well at the same time. Thus, a problem arises in that, at the time of manufacture, the dye contained in the recording layer partially decomposes, and the recording characteristics deteriorate.

SUMMARY OF THE INVENTION

The present invention was developed in light of the above-described drawbacks of the prior art, and an object of the present invention is to provide an optical information recording medium which has good recording characteristics by suppressing the decomposition of a dye contained in a dye recording layer at the time that a photocurable resin is photocured to form a photocured layer. Another object of the present invention is to provide a method of manufacturing an optical information recording medium in which a photocurable resin can be photocured and a photocured layer can be formed, without a dye contained in a dye recording layer decomposing.

The above-described objects are achieved by the following means.

A first aspect of the optical information recording medium of the present invention is an optical information recording medium comprising: a substrate; a recording layer on which information can be recorded by laser light, and which contains a dye having a main absorption band in a predetermined wavelength region; and a photocured layer which is formed by photocuring by light of a wavelength other than the predetermined wavelength region.

A second aspect of the optical information recording medium of the present invention is an optical information recording medium comprising: a transparent substrate; a recording layer which is formed on one surface of the transparent substrate, and on which information can be recorded by laser light, and which contains a dye having a main absorption band in a predetermined wavelength region; and a photocured layer which is formed on another surface of the transparent substrate, and which is formed by photocuring by light of a wavelength other than the predetermined wavelength region.

A third aspect of the optical information recording medium of the present invention is an optical information recording medium comprising: a substrate; a light reflecting layer which is formed on the substrate; a recording layer which is formed on the light reflecting layer, and on which information can be recorded by laser light, and which contains a dye having a main absorption band in a predetermined wavelength region; and a photocured layer which is formed on the recording layer by photocuring by light of a wavelength other than the predetermined wavelength region.

In the optical information recording media of the first through third aspects, the recording layer, on which information can be recorded by laser light, contains a dye having a main absorption band in a predetermined wavelength region. The photocured layer is formed by photocuring by light in a wavelength region other than the predetermined wavelength region in which the dye has the main absorption band. Thus, at the time of manufacturing, the decomposition of the dye contained in the dye recording layer is suppressed, and the optical information recording media have good recording characteristics.

Here, light in a wavelength region other than the predetermined wavelength region, i.e., light which is other than light in the main absorption band of the dye contained in the dye recording layer, is light in a wavelength region at which the light transmittance of the dye recording layer alone is at least 50% or more (0.3 or less as expressed by optical density). In order to better suppress decomposition of the dye, light in a wavelength region at which the light transmittance is 60% or more is preferable, and light in a wavelength region at which the light transmittance is 70% or more is more preferable.

Further, in order to better suppress the decomposition of the dye, the amount of irradiation of the photocurable resin by light in the wavelength region at which the light transmittance of the dye recording layer alone is at least 50% or more is preferably 50% or more, and more preferably 60% or more, and particularly preferably 70% or more, with respect to the entire amount of irradiation.

A fourth aspect of the optical information recording medium of the present invention is an optical information recording medium comprising: a substrate; a light reflecting layer which is formed on the substrate; a recording layer which is formed on the light reflecting layer, and on which information can be recorded by laser light, and which contains a dye having a main absorption band in a wavelength region of 400 nm or less; and a photocured layer which is formed on the recording layer by photocuring such that an amount of irradiation by light in a wavelength region of 400 nm or less is less than an amount of irradiation by light in a wavelength region at a longer wavelength side of 400 nm.

In the fourth aspect of the optical information recording medium of the present invention, the recording layer, on which information can be recorded by laser light, contains a dye having a main absorption band in the wavelength region of 400 nm or less. The photocured layer, which is formed on the recording layer, is formed by photocuring such that the amount of irradiation by light in the wavelength region of 400 nm or less, in which the dye has a main absorption band, is less than the amount of irradiation by light in the range of wavelengths longer than 400 nm. Thus, at the time of manufacturing, the decomposition of the dye contained in the dye recording layer is suppressed, and the optical information recording medium has good recording characteristics.

In the fourth aspect of the optical information recording medium of the present invention, in order to better suppress the decomposition of the dye, the amount of irradiation of the photocurable resin by light in the wavelength region of 400 nm or less is preferably 40% or less, and more preferably 30% or less, and even more preferably 20% or less, of the entire amount of irradiation (the amount of irradiation in the range of wavelengths of 300 to 800 nm).

A method of manufacturing an optical information recording medium of the present invention comprises the step of: manufacturing an optical information recording medium by forming, on a substrate on which is formed a recording layer on which information can be recorded by laser light and which contains a dye having a main absorption band in a predetermined wavelength region, a photocured layer by photocuring a photocurable resin by light of a wavelength other than the predetermined wavelength region.

BRIEF DESCRIPTION OF THE DRAWINGS

FIG. 1 is a perspective view showing a schematic structure of an optical information recording medium relating to a first embodiment. In FIG. 1, reference numeral 12 denotes a transparent substrate, 14 denotes a dye recording layer, 16 denotes a light reflecting layer, 18 denotes a protective layer, and 20 denotes a hard-coat layer.

FIG. 2 is a graph showing spectral transmittance of a dye layer containing cyanine dye (A) for CD-Rs.

FIG. 3 is a graph showing a spectral fading rate of the dye layer whose spectral transmittance is shown in FIG. 2.

In FIG. 4, reference numeral 22 denotes an intermediate layer, 24 denotes an adhesive layer, and 26 denotes a thin protective layer.

FIG. 5 is a graph showing spectral transmittance of a dye layer which contains dye (B).

FIG. 6 is a schematic sectional view showing a configuration of a pre-groove.

DESCRIPTION OF THE PREFERRED EMBODIMENTS

Figure 4:
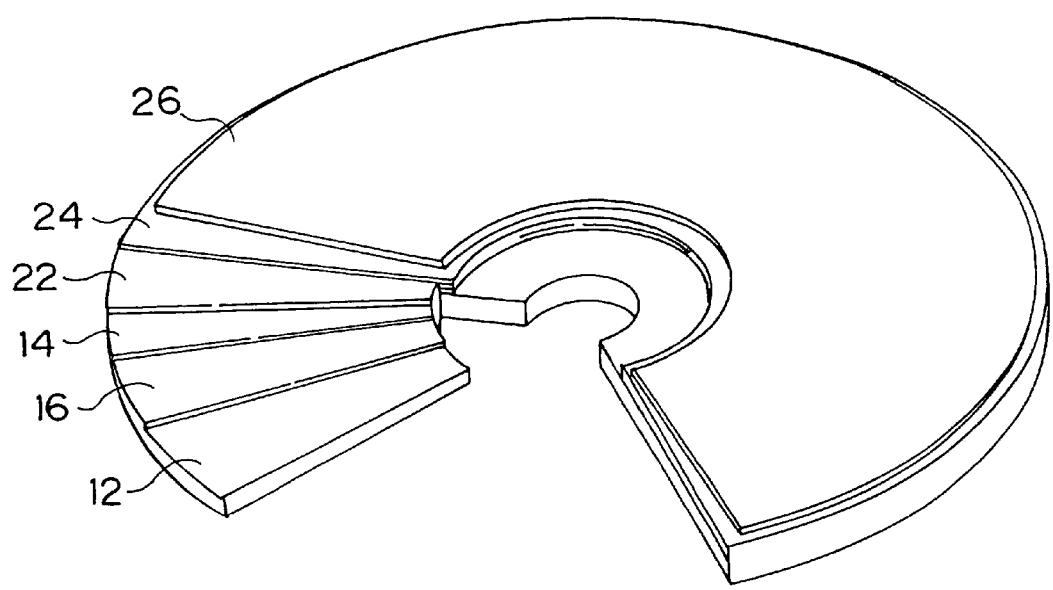
FIG. 4 is a perspective view showing a schematic structure of an optical information recording medium relating to a second embodiment.

Hereinafter, embodiments of the present invention will be described in detail with reference to the figures.

(First Embodiment)

A first embodiment is an example in which the present invention is applied to a CD-R type optical information recording medium provided with a hard-coat layer on a surface of a substrate. As shown in FIG. 1, the CD-R type optical information recording medium relating to the first embodiment is formed by a disk-shaped transparent substrate 12 in which a center hole is formed at the center portion thereof, a dye recording layer 14 containing an organic dye, a light reflecting layer 16, a protective layer 18, and a hard-coat layer 20. A spiral pre-groove is formed in the transparent substrate 12 in a region within a predetermined radius range other than the peripheral portion of the center hole and the outer peripheral edge portion of the transparent substrate 12. The dye recording layer 14 is provided on the region at which the pre-groove is formed. The light reflecting layer 16 is provided on the dye recording layer 14 so as to cover the dye recording layer 14. The protective layer 18 is provided oil the light reflecting layer 16 so as to cover the light reflecting layer 16. Further, the hard-coat layer 20 is provided on the surface of the transparent substrate 12 at the side opposite to the side at which the dye recording layer 14 is provided. The feature of the optical information recording medium relating to the present invention is that the hard-coat layer 20 is formed by a photocurable resin which is cured by light other than light in a main absorption band of the dye (hereinafter, "recording layer dye") which is contained in the dye recording layer 14. Hereinafter, structures of the respective layers of the optical information recording medium will be described in detail in accordance with the manufacturing process.

First, the transparent substrate 12 is prepared. The transparent substrate 12 is a disk-shaped, transparent, resin plate. Here, "transparent" means transparent with respect to recording light and playback light. Examples of substrate materials are polycarbonate; acrylic resins such as polymethyl methacrylate and the like; vinyl chloride resins such as polyvinyl chloride, vinyl chloride copolymers, and the like; epoxy resins; amorphous polyolefine, glass, polyester, and the like, and these materials may be used in combination if desired. Among the aforementioned materials, from the standpoints of moisture resistance, dimensional stability, and cost, amorphous polyolefine and polycarbonate are preferable, and polycarbonate is particularly preferable. Further, the thickness of the transparent substrate 12 is preferably 1.2±0.2 mm.

Guide grooves for tracking or indentations (pre-grooves) which indicate information such as address signals or the like are formed in the transparent substrate 12. The mean pitch of these pre-grooves is preferably from 0.1 to 50 $\mu$m, more preferably from 0.2 to 30 $\mu$m, and even more preferably from 0.3 to 10 $\mu$m. Further, the mean depth of the pre-grooves is preferably from 10 to 5000 $\mu$m, more preferably from 30 to 3000 $\mu$m, and even more preferably from 50 to 1000 $\mu$m.

Next, the dye recording layer 14, on which information can be recorded by laser light, is formed on the transparent substrate 12. The recording layer dye is not particularly limited. Examples of dyes which can be used are cyanine dyes, phthalocyanine dyes, imidazoquinoxaline dyes, pyrylium/thiopyrylium dyes, azulenium dyes, squarylium dyes, metallic complex salt (such as Ni, Cr, or the like) dyes, naphthoquinone dyes, anthraquinone dyes, indophenol dyes, indoaniline dyes, triphenylmethane dyes, merocyanine dyes, oxonol dyes, aminium/diimmonium dyes, and nitroso compounds.

The dye recording layer is formed by applying a solution in which a dye is dissolved in an appropriate solvent. The concentration of the dye in the coating liquid is generally from 0.01 to 15 wt %, preferably from 0.1 to 10 wt %, particularly preferably from 0.5 to 5 wt %, and most preferably from 0.5 to 3 wt %. Examples of solvents of the coating liquid for forming the dye recording layer are esters such as butyl acetate, cellusolve acetate and the like; ketones such as methyl ethyl ketone, cyclohexanone, methyl isobutyl ketone, and the like; chlorinated hydrocarbons such as dichloromethane, 1,2-dichloroethane, chloroform, and the like; amides such as dimethylformamide and the like; hydrocarbons such as cyclohexane and the like; ethers such as tetrahydrofuran, ethyl ether, dioxane and the like; alcohols such as ethanol, n-propanol, isopropanol, n-butanol, diacetone alcohol, and the like; fluorine-based solvents such as 2,2,3,3-tetrafluoropropanol and the like; glycol ethers such as ethyleneglycol monomethylether, ethyleneglycol monoethylether, propyleneglycol monomethylether, and the like. In consideration of the solubility of the dye which is used, the above solvents may be used singly or a combination of two or more types thereof may suitably be used. Fluorine-based solvents such as 2,2,3,3-tetrafluoropropanol and the like are preferably used. The thickness of the dye recording layer is generally 20 to 500 nm, and preferably 50 to 300 nm.

If desired, fading preventing agents and binders may be added to the coating solution for forming the dye recording layer. Moreover, any of various types of additives such as antioxidants, UV absorbents, plasticizers, lubricants and the like may be used in accordance with the object. Representative examples of the fading preventing agents are nitroso compounds, metal complexes, diimmonium salts, and aminium salts. Examples thereof are disclosed in, for example, Japanese Patent Application Laid-Open (JP-A) No. 2-300288, JP-A No. 3-224793, JP-A No. 4-146189 and the like. Examples of the binder include natural organic polymer substances such as gelatin, cellusose derivatives, dextran, rosin, rubber and the like; as well as synthetic organic polymers such as hydrocarbon resins (polyethylene, polypropylene, polystyrene, polyisobutylene, and the like), vinyl resins (polyvinyl chloride, polyvinylidene chloride, polyvinyl chloride— polyvinyl acetate copolymers, and the like), acrylic resins (polymethyl acrylate, polymethyl methacrylate, and the like), polyvinyl alcohol, chlorinated polyethylene, epoxy resins, butyral resins, rubber derivatives, initial condensation products of thermosetting resins such as phenol-formaldehyde resins, and the like. When a binder is used, the amount thereof is generally 20 parts by weight or less, preferably 10 parts by weight or less, and more preferably 5 parts by weight or less, with respect to 100 parts by weight of the dye.

Further, an undercoat layer may be provided on the surface of the transparent substrate 12 at the side at which the dye recording layer 14 is provided, in order to improve the flatness, improve the adhesion, and prevent changing of the properties of the dye recording layer. Examples of the material for the undercoat layer are high polymer substances such as polymethyl methacrylate, acrylate-methacrylate copolymers, styrene-maleic anhydride copolymers, polyvinyl alcohol, N-methylolacrylamide, styrene-vinyltoluene copolymers, chlorosulfonated polyethylene, nitrocellulose, polyvinyl chloride, chlorinated polyolefine, polyester, polyimide, vinyl acetate-vinyl chloride copolymers, ethylene-vinyl acetate copolymers, polyethylene, polypropylene, polycarbonate, and the like; and surface modifying agents such as silane coupling agents or the like. The undercoat layer may be formed as follows: the above substance is dissolved or dispersed in an appropriate solvent so as to prepare a coating liquid, and the coating liquid is applied to the surface of the substrate by using a coating method such as spin coating, dip coating, extrusion coating or the like. The thickness of the undercoat layer is generally 0.005 to 20 μm, and preferably 0.01 to 10 μm.

The light reflecting layer 16 is provided on the dye recording layer 14. It suffices for the material of the light reflecting layer 16 to be a light reflecting substance having high reflectance with respect to laser light. The reflectance of the material is preferably 30% or more, more preferably 50% or more, and even more preferably 70% or more. Examples thereof include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi, as well as metalloids and stainless steel. Preferable among these are Cr, Ni, Pt, Cu, Ag, Au, Al and stainless steel. A single one of these substances may be used, or two or more may be used in combination. Further, an alloy may be used. The material of the light reflecting layer 16 is particularly preferably Au, Ag, Al, or alloys thereof. The light reflecting layer 16 can be formed by, for example, depositing, sputtering, or ion plating the reflective substance. The thickness of the light reflecting layer 16 is generally 10 to 800 nm, preferably 20 to 500 nm, and more preferably 50 to 300 nm.

Next, the protective layer 18 is formed on the light reflecting layer 16. The protective layer 18 is provided in order to improve the scratch resistance, the moisture resistance, and the like of the optical information recording medium. Examples of the materials used for the protective layer are inorganic substances such as SiO, $SiO_2$, $MgF_2$, $SnO_2$, $Si_3N_4$ and the like, and organic substances such as thermoplastic resins, thermosetting resins, photocurable resins, and the like. The protective layer may be formed by, for example, laminating a film, which is obtained by extruding a plastic, on the light reflecting layer via an adhesive. Alternatively, the protective layer may be formed by a method such as vacuum deposition, sputtering, coating or the like. When the protective layer is formed by a thermoplastic resin or a thermosetting resin, the protective layer may be formed by the resin being dissolved in an appropriate solvent so as to form a coating solution, and thereafter, the coating solution being coated and dried. When the protective layer is formed by a photocurable resin, the protective layer may be formed by applying the photocurable resin or a coating solution in which the photocurable resin is dissolved in an appropriate solvent, and thereafter, curing by irradiating UV light. Various additives such as antistatic agents, antioxidants, UV absorbents or the like may be added to the coating solution in accordance with the object. The thickness of the protective layer 18 is generally 0.1 to 100 μm.

Lastly, the hard-coat layer 20 is provided on the surface of the transparent substrate 12 at the side opposite to the side at which the dye recording layer 14 is provided. The hard-coat layer 20 is formed by a photocurable resin which has high hardness after being photocured, and which is cured by light of a wavelength other than wavelengths in the main absorption band of the recording layer dye.

The hardness of the hard-coat layer is preferably greater than or equal to a pencil hardness of 2H. The photocurable resin used for the hard-coat layer is appropriately selected in accordance with the main absorption band of the recording layer dye. The hard-coat layer may be formed by applying the selected photocurable resin or a coating solution in which the selected photocurable resin is dissolved in an appropriate solvent on a transparent substrate, and thereafter, curing the coated film by irradiating light of a wavelength other than wavelengths of the main absorption band of the recording layer dye. The light irradiated onto the coated film may be limited to light of a predetermined wavelength region by an optical filter. Further, the coated film may be irradiated by using a light source whose emission wavelength region is narrow, such as a laser light source. Note that the photocurable resin preferably has low cure shrinkage in order to prevent warping of the disk. The thickness of the hard-coat layer is preferably 0.1 to 50 μm, more preferably 1 to 20 μm, and particularly preferably 2 to 10 μm in order to achieve sufficient protection and for warping to not occur at the substrate.

For example, in a case in which the following cyanine dye (A) is used as the recording layer dye, the photocurable resin and the wavelength of light which is irradiated at the time of photocuring are determined by the following processes.

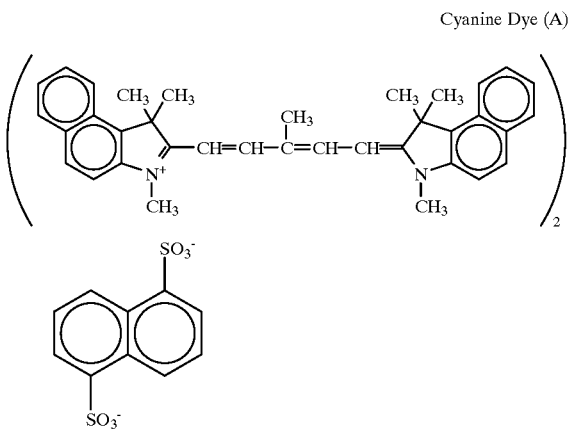

Cyanine Dye (A)

[2.65 g of the above cyanine dye (A) was dissolved in 100 ml of 2,2,3,3-tetrafluoropropanol so as to prepare a coating liquid. The coating liquid was applied to the surface of a transparent polycarbonate substrate having a thickness of 0.6 mm (manufactured by Teijin KK; trade name: PANLIGHT AD5503) by spin coating while varying the rotation speed from 300 rpm to 2000 rpm, and was dried such that a dye layer (thickness: about 150 nm) was formed thereon. The spectral transmittance (dye optical density at respective wavelengths from 300 nm to 800 nm) of the substrate after forming the dye layer was measured. The measured spectral transmittance is shown in FIG. 2. Note that, the optical density is a value which is expressed at $\log_{10}(1/T)$ when the transmittance with respect to light of a predetermined wavelength is T.

It can be understood from FIG. 2 that the cyanide dye has absorption at wavelengths shorter than 400 nm, and at 550 nm to 800 nm, and hardly has any absorption at 400 nm to 550 nm. Namely, the absorption bands of less than 400 nm and from 550 nm to 800 nm, in which the spectral transmittance is less than 50% (the optical density is greater than about 0.3), are the main absorption band of cyanine dye (A).

The substrate, after the dye layer was formed, was set at a diffraction grating irradiation spectroscope, which divides xenon light by a diffraction grating and can irradiate the divided light onto a sample, and was irradiated for eight hours. The dye optical density at that time was measured, and the rate of decrease in the dye optical density was standardized by the irradiation energy, and the color fading rates at respective wavelengths were calculated. For example, in the case in which the optical density before exposure was 1.13, the optical density after exposure was 0.90, and the irradiation energy was 1.95 (megaerg/$cm^2$), the rate of decrease in optical density was (1.31−0.90) 1.31= 0.313, and the color fading rate was 0.313/1.95=0.161. This clarifies how much the dye optical density decreases by how much light energy. Note that, in order to keep errors to a minimum, the dye optical density was measured at a wavelength of 670 nm at which optical density is large, regardless of the wavelength of the irradiated light.

FIG. 3 is a graph showing the spectral color fading rate at this time. It can be understood from FIG. 3 that in a case in which light in the region from 550 nm to 800 nm, which is in the main absorption band, is irradiated, the spectral color fading rate is high, and at other lights, almost no color fading occurs. Namely, it can be understood that almost no color fading occurs at lights in a wavelength region at which the light transmittance of the dye recording layer alone is 50% or more (the optical density is around 0.3 or less).

It can be understood from these results that, in a case in which the cyanine dye (A) is used as the recording layer dye, in order to prevent color fading, it suffices to block light in the region from 550 nm to 800 nm, and even if light of wavelengths shorter than 550 nm is transmitted, no problems arise. Accordingly, a photocurable resin which is cured by light in the wavelength region from 400 nm to 550 nm is selected as the photocurable resin used for the hard-coat layer. The photocurable resin is cured by irradiating light in the wavelength region from 400 nm to 550 nm, and the hard-coat layer is formed.

As described above, in the CD-R type optical information recording medium of the present embodiment, the hard-coat layer is provided on the surface of the transparent substrate at the side opposite to the side at which the dye recording layer is provided. Because the hard-coat layer is formed of a photocurable resin, which has high hardness after being photocured and which is cured by light other than light in the main absorption band of the recording layer dye, the scratch resistance of the light incident side surface of the transparent substrate is improved, the recording layer dye does not decompose at the time of manufacturing, and the obtained optical information recording medium exhibits good recording characteristics.

(Second Embodiment)

A second embodiment is an example in which the present invention is applied to a writable type optical information recording medium for shorter wavelengths (wavelengths of around 405 nm) provided with a thin protective layer on the surface at the side opposite to the substrate side. As shown in FIG. 4, the writable optical information recording medium for shorter wavelengths relating to the second embodiment is formed by the disk-shaped transparent substrate 12 in which a center hole is formed at the center portion thereof, the light reflecting layer 16, the dye recording layer 14 containing an organic dye, an intermediate layer 22, an adhesive layer 24, and a thin protective layer 26. A spiral pre-groove is formed in the transparent substrate 12 in a region within a predetermined radius range other than the peripheral portion of the center hole and the outer peripheral edge portion of the transparent substrate 12. The light reflecting layer 16 is provided on the region at which the pre-groove is formed. The dye recording layer 14 is provided on the light reflecting layer 16 so as to cover the light reflecting layer 16. The intermediate layer 22 is provided on the dye recording layer so as to cover the dye recording layer 14. Further, the thin protective layer 26 is provided via the adhesive layer 24 on the surface of the disk at the side opposite the transparent substrate 12. The feature of the optical information recording medium relating to the present embodiment is that, at the time of forming the thin protective layer 26 via the adhesive layer 24, the adhesive layer 24 is formed by a photocurable resin which is cured by light other than light in the main absorption band of a recording layer dye. Hereinafter, structures of the respective layers of the optical information recording medium will be described in detail in accordance with the manufacturing process.

First, the transparent substrate 12 is prepared. The transparent substrate 12 is a disk-shaped, transparent, resin plate. The same materials as those in the first embodiment may be used as the substrate materials.

Next, the light reflecting layer 16 is formed on the transparent substrate 12. The same materials as those in the first embodiment may be used as the materials of the light reflecting layer. Further, the light reflecting layer may be formed in the same way as in the first embodiment.

Next, the dye recording layer 14, on which information can be recorded by laser light, is formed on the light reflecting layer 16. Because recording is carried out by irradiating light of a wavelength around 405 nm and shorter wavelengths, the recording layer dye is preferably a cyanine dye, an oxonol dye, a metallic complex dye, an azo dye, or a phthalocyanine dye. Further, the light reflecting layer may be formed in the same way as in the first embodiment.

Next, the intermediate layer 22 is formed on the dye recording layer 14. The intermediate layer is provided in order to improve the storability of the dye recording layer and the adhesion between the dye recording layer and the thin protective layer. Examples of the materials used for the intermediate layer are inorganic substances such as SiO, $SiO_2$, $MgF_2$, $SnO_2$, $Si_3N_4$ and the like. Further, the intermediate layer may be formed by vacuum film formation such as deposition, sputtering, or the like.

Lastly, the thin protective layer 26 is formed on the intermediate layer 22 via the adhesive layer 24 which is formed from a photocurable resin. The thin protective layer 26 is provided for reasons such as improvement of scratch resistance and moisture resistance of the optical information recording medium. The thin protective layer is preferably a photocurable resin or a film-like resin. Further, the thickness of the thin protective layer is generally 10 to 300 $\mu$m, preferably 30 to 200 $\mu$m, and more preferably 50 to 150 $\mu$m.

The photocurable resin which is used as the adhesive is appropriately selected in accordance with the main absorption band of the recording layer dye. The selected photocurable resin can be applied onto the intermediate layer as is, or a coating solution in which the selected photocurable resin is dissolved in an appropriate solvent may be prepared, and thereafter, this coating solution may be applied onto the intermediate layer. Then, a resin film which is obtained by, for example, extruding a plastic may be laminated on the coated film, and the laminated resin film can be adhered onto the intermediate layer by curing the coated film by irradiating light of a wavelength other than the main absorption band of the recording layer dye from above the laminated resin film. The thin protective layer is thereby formed.

The light irradiated onto the coated film can be limited to light in a predetermined wavelength region by using an optical filter. Alternatively, the coated film may be irradiated by using a light source having a narrow emission wavelength region, such as a laser light source. Note that the photocurable resin preferably has low cure shrinkage in order to prevent warping of the disk. Further, the thickness of the adhesive is preferably 0.1 to 100 $\mu$m, more preferably 1 to 50 $\mu$m, and particularly preferably 2 to 20 $\mu$m, in order to achieve sufficient protection and for warping to not occur at the substrate.

For example, in the case in which the following dye (B) is used as the recording layer dye, the photocurable resin and the wavelength of the light irradiated at the time of photocuring are determined by the following processes.

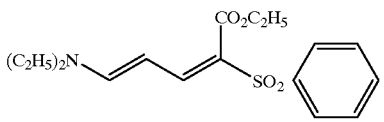

Dye (B)

2.65 g of the above dye (B) was dissolved in 100 ml of 2,2,3,3-tetrafluoropropanol so as to prepare a coating liquid. The coating liquid was applied to the surface of a transparent polycarbonate substrate of a thickness of 0.6 mm (manufactured by Teijin KK; trade name: PANLIGHT AD5503) by spin coating while varying the rotation speed from 300 rpm to 2000 rpm, and was dried such that a dye layer (thickness: about 150 nm) was formed. The spectral transmittance (dye optical density at respective wavelengths from 300 nm to 600 nm) of the substrate after forming the dye layer was measured. The measured spectral transmittance is shown in FIG. 5. It can understood from FIG. 5 that dye (B) has absorption at wavelengths shorter than 400 nm, and has hardly any absorption at wavelengths longer than 400 nm. Namely, the wavelength band of less than or equal to 400 nm, in which the spectral transmittance is less than 50% (the optical density is greater than about 0.3), is the main absorption band of dye (B).

It can be understood from these results that in a case in which dye (B) is used as the recording layer dye, in order to prevent color fading, it suffices for light in the range of less than or equal to 400 nm to be blocked, and even if light of a wavelength longer than 400 nm is transmitted, no problems arise. Accordingly, a photocurable resin which is cured by light in a range of wavelengths longer than 400 nm is selected as the photocurable resin used as the adhesive. The photocurable resin is cured by irradiating light mainly in a wavelength region longer than 400 nm, and the thin protective layer is adhered. In order to suppress decomposition of the recording layer dye even more, the amount of irradiation of the photocurable resin by light in the wavelength region less than or equal to 400 nm is preferably less than or equal to 40%, more preferably less than or equal to 30%, and even more preferably less than or equal to 20%, of the entire amount of irradiation (the amount of irradiation in the wavelength region of 300 to 800 nm).

As described above, in the writable optical information recording medium for short wavelengths of the present embodiment, the thin protective layer is formed via the adhesive layer on the surface of the disk at the side opposite to the transparent substrate. Because the adhesive layer is formed by a photocurable resin which is cured by light other than light in a main absorption band of the recording layer dye, the recording layer dye does not decompose at the time of manufacturing, and the obtained writable optical information recording medium for shorter wavelengths exhibits good recording characteristics.

EXAMPLES

Next, the present invention will be described in detail by way of Examples. However, the present invention is not limited to the following Examples.

Example 1

[Production of CD-R Type Optical Disk]

A spiral pre-groove (track pitch: 1.6 μm; pre-groove width: 0.5 μm; pre-groove depth: 0.18 μm; pre-groove angle of inclination: 55°) was formed in the surface of a polycarbonate substrate (outer diameter: 120 mm; inner diameter: 15 mm; thickness: 1.2 mm; manufactured by Teijin KK; trade name: PANLIGHT AD5503) by injection molding. FIG. 6 is a schematic sectional view showing the shape of the pre-groove. As defined in FIG. 6, the pre-groove depth D is the distance from the surface of the substrate before forming the groove to the deepest point of the groove, the pre-groove width W is the width of the groove at a depth of D/2, and the pre-groove angle of inclination θ is the angle formed by the substrate surface and the straight line connecting the inclined portion at a depth of D/10 from the surface of the substrate before forming the groove and the inclined portion at a depth of D/10 from the deepest point of the groove.

Next, 2.65 g of the above cyanine dye (A) was dissolved in 100 ml of 2,2,3,3-tetrafluoropropanol over one hour by using an ultrasonic vibrator (1800 W), so as to prepare a coating liquid for forming the recording layer. 0.5 ml of this coating liquid was dispensed at 300 rpm, and applied to the pre-groove side surface of the above polycarbonate substrate by spin coating while varying the rotation speed from 300 rpm to 4000 rpm, and was dried such that a dye recording layer was formed. The thickness of the formed dye recording layer within the pre-groove was 190 nm, and the thickness of the formed dye recording layer at the land portion was 100 nm.

Next, a light reflecting layer having a film thickness of 80 nm was formed on the dye recording layer by sputtering Ag. Then, a UV-curable resin (trade name: SD-318, manufactured by Dainippon Ink and Chemicals Co., Ltd.) was applied by spin coating onto the light reflecting layer while the rotational speed was varied from 50 rpm to 5000 rpm. After coating, light was irradiated from above from a xenon lamp such that the coated film was cured to form a protective layer of a thickness of 7 μm.

Figure 7:
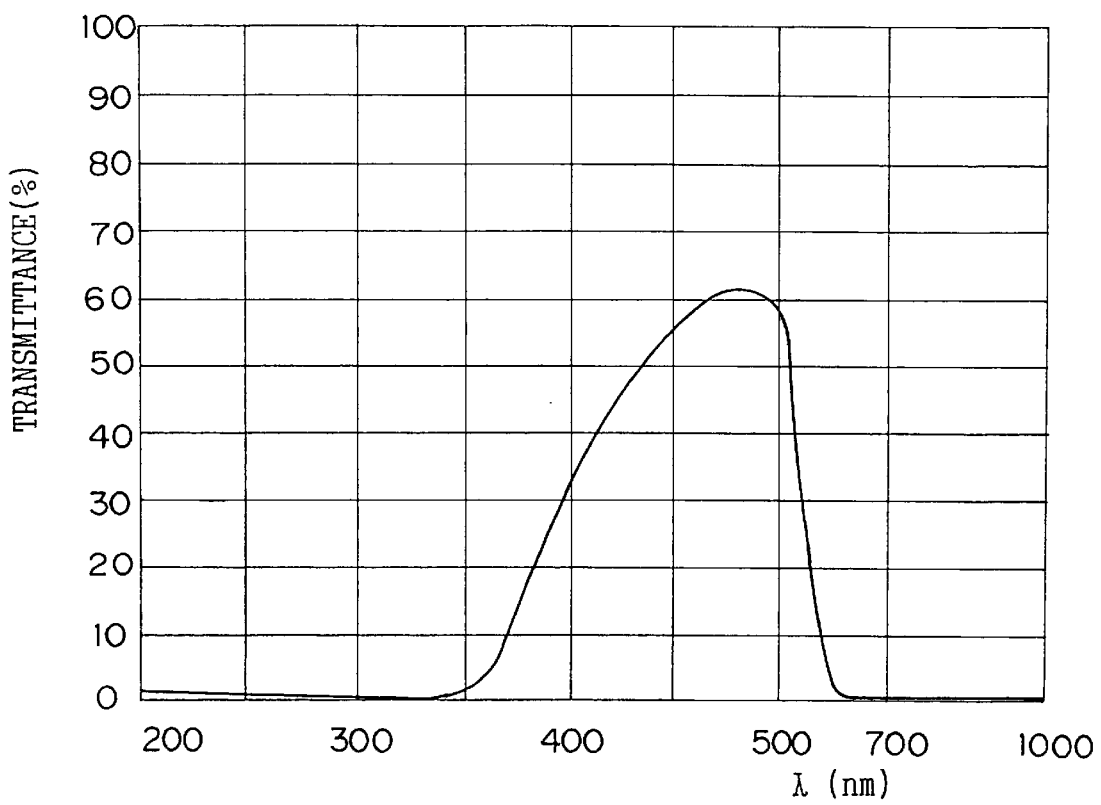
FIG. 7 is a graph showing filtering characteristics of an optical filter of Example 1.

Next, a UV-curable resin (trade name: SD-318, manufactured by Dainippon Ink and Chemicals Co., Ltd.) was applied by spin coating onto the surface of the obtained disk at the polycarbonate substrate side while the rotational speed was varied from 50 rpm to 5000 rpm, so as to form a film of a film thickness of 5 μm. After coating, an optical filter (trade name: BLF-50S-480B, manufactured by Shiguma Kouki Co.) was inserted between the xenon lamp and the disk, and as shown in FIG. 7, the coated film was cured by irradiating light, from which light of 400 nm or less and light of 550 nm or more was greatly cut, such that a hard-coat layer having a thickness of 5 μm was formed. Note that the curing of the coated film was carried out under a nitrogen atmosphere of a concentration of 90% or more. By the above processes, the CD-R type optical information recording medium (CD-R type optical disk) in accordance with the present invention, which was provided with a substrate, a dye recording layer, a light reflecting layer, a protective layer, and a hard-coat layer, was prepared.

[Evaluation as an Optical Disk]

The above CD-R type optical disk in accordance with the present invention was recorded at a recording wavelength of 780 nm, a speed of four times, and a recording power varied from 10 to 16 mW, by using an "OMT2000" evaluator (manufactured by Pulstec Co.). The bottom value of the C1 error of the recorded optical disk was measured and found to be 8, and satisfactory recording characteristics were exhibited.

Comparative Example 1

A CD-R type optical disk of a comparative example was produced in the same way as Example 1, except that an optical filter was not used at the time that the hard-coat layer was formed. The bottom value of the C1 error was measured in the same way as the CD-R type optical disk of Example 1 and was found to be 105 which is large, and the recording characteristics were markedly poor. It is thought that the poor recording characteristics were due to the recording layer dye decomposing.

Example 2

[Production of Optical Disk for Shorter Wavelengths]

A spiral pre-groove (track pitch: 0.4 μm; pre-groove width: 0.2 μm; pre-groove depth: 0.08 μm; pre-groove angle of inclination: 60°) was formed in the surface of a polycarbonate substrate (outer diameter: 120 mm; inner diameter: 15 mm; thickness: 1.2 mm; manufactured by Teijin KK; trade name: PANLIGHT AD5503) by injection molding.

Next, a light reflecting layer having a film thickness of 80 in was formed on the pre-groove side surface of the polycarbonate substrate by sputtering Ag by DC magnetron sputtering.

Then, 1.5 g of the above dye (B) was dissolved in 100 ml of 2,2,3,3-tetrafluoropropanol over one hour by using an ultrasonic vibrator (1800 W), so as to prepare a coating liquid for forming the recording layer. 0.5 ml of this coating liquid was dispensed at 300 rpm, and applied to the pre-groove side surface of the polycarbonate substrate, on which the light reflecting layer was formed, by spin coating while varying the rotation speed from 300 rpm to 4000 rpm, and was dried such that a dye recording layer was formed. The thickness of the formed dye recording layer within the pre-groove was 100 nm, and the thickness of the formed dye recording layer at the land portion was 60 nm. Moreover, an intermediate layer having a film thickness of 20 nm was formed on the dye recording layer by sputtering $ZnS/SiO_2$ (80% by mass/20% by mass) by RF magnetron sputtering.

Figure 8:
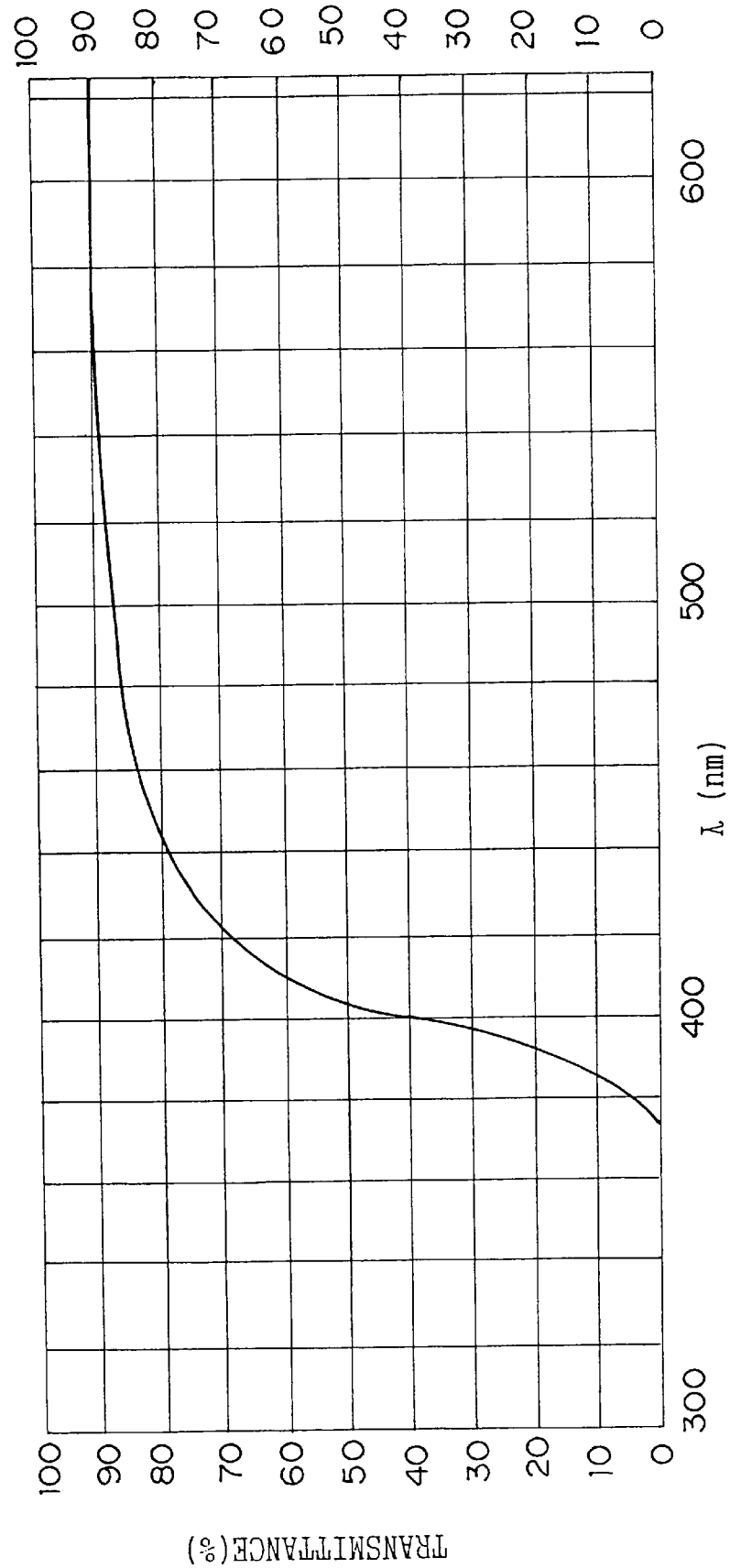
FIG. 8 is a graph showing filtering characteristics of an optical filter of Example 2.

Then, a UV-curable resin (trade name: SD-640, manufactured by Dainippon Ink and Chemicals Co., Ltd.) was dispensed at a region slightly inwardly of the inner periphery of the disk. A triacetate resin film having a thickness of 80 μm, which was to become a thin protective layer, was placed on the surface the disk at the side at which the intermediate layer was formed. The disk was rotated at a rotational speed of 1500 rpm such that the UV-curable resin diffused between the polycarbonate substrate and the resin film. In this way, the dye recording layer was sandwiched between the polycarbonate substrate and the resin film. Thereafter, an optical filter (trade name: SCF-50S-40L, manufactured by Shiguma Kouki Co.) was inserted between the xenon lamp and the disk, and as shown in FIG. 8, the coated film was cured by irradiating light, from which light of 400 nm or less was greatly cut, such that an adhesive layer having a thickness of 8 μm was formed. The amount of irradiation of the UV-curable resin by light in the wavelength region of 400 nm or less was reduced by the optical filter to about 33% of the entire amount of irradiation (the amount of irradiation in the range of wavelengths of 300 to 800 nm).

The curing of the coated film was carried out under a nitrogen atmosphere of a concentration of 90% or more. By the above processes, the writable type optical information recording medium for shorter wavelengths (optical disk for shorter wavelengths) in accordance with the present invention, which was provided with a substrate, a light reflecting layer, a dye recording layer, an intermediate layer, an adhesive layer, and a thin protective layer, was produced.

[Evaluation as an Optical Disk]

An 8–16 modulated signal for DVD was recorded onto the above optical disk for shorter wavelengths in accordance with the present invention at a recording wavelength of 408 nm and a linear speed of 3.5 m/s by using a "DDU1000" evaluator (manufactured by Pulstec Co.). The recording power was varied by 1 mW increments from 4 to 12 mW, and the 14T signal amplitude at the time when the value of β was closest to zero was measured, so as to determine the degree of modulation. As a result, the degree of modulation was found to be 65%, and good recording characteristics were exhibited. Note that the degree of modulation expresses, as a percentage, a value obtained by dividing the 14 T signal amplitude by the reflectance of a portion between recorded pits.

Comparative Example 2

An optical disk for shorter wavelengths of a comparative example was produced in the same way as in Example 2, except that the optical filter was not used when the thin protective layer was formed via the adhesive layer. In the same way as the optical disk for shorter wavelengths of Example 2, the 14T signal amplitude was measured and the degree of modulation was determined. As a result, the degree of modulation was found to be 50% which is low, the recording characteristics were markedly poor. It is thought that the poor recording characteristics were due to the decomposition of the recording layer dye.

The present invention provides an optical information recording medium having good recording characteristics by suppressing the decomposition of the dye which is included in the dye recording layer, at the time the photocured layer is formed by photocuring the photocurable resin. Further, the present invention provides a method of manufacturing an optical information recording medium which can form a photocured layer by photocuring a photocurable resin, without decomposing the dye which is contained in the dye recording layer.

What is claimed is:

1. An optical information recording medium comprising:
   a substrate;
   a recording layer on which information can be recorded by laser light, and which contains a dye having a main absorption band in a predetermined wavelength region; and
   a photocured layer which is formed by photocuring by light of a wavelength other than the predetermined wavelength region,
   wherein the substrate is transparent, the recording layer is formed on one surface of the transparent substrate, and the photocured layer is formed on another surface of the transparent substrate.

2. An optical information recording medium comprising:
   a substrate;
   a recording layer on which information can be recorded by laser light, and which contains a dye having a main absorption band in a predetermined wavelength region; and
   a photocured layer which is formed by photocuring by light of a wavelength other than the predetermined wavelength region,
   wherein a light reflecting layer is formed on the substrate, the recording layer is formed on the light reflecting layer, and the photocured layer is formed on the recording layer,
   wherein information can be recorded on the recording layer with laser light, the recording layer includes a dye having a main absorption band in a wavelength region of 400 nm or less, and the photocured layer is formed by photocuring such that an amount of irradiation by light in the wavelength region of 400 nm or less is less than an amount of irradiation by light in a wavelength region greater than 400 nm.

3. A method of manufacturing an optical information recording medium, comprising the step of:

manufacturing an optical information recording medium by forming, on a substrate on which is formed a recording layer on which information can be recorded by laser light and which contains a dye having a main absorption band in a predetermined wavelength region, a photocured layer by photocuring a photocurable resin by light of a wavelength other than the predetermined wavelength region, wherein the substrate is transparent, the recording layer is formed on one surface of the transparent substrate, and the photocured layer is formed on another surface of the transparent substrate.

4. A method of manufacturing an optical information recording medium, comprising the step of:

manufacturing an optical information recording medium by forming, on a substrate on which is formed a recording layer on which information can be recorded by laser light and which contains a dye having a main absorption band in a predetermined wavelength region, a photocured layer by photocuring a photocurable resin by light of a wavelength other than the predetermined wavelength region, wherein the substrate is transparent, the recording layer is formed on one surface of the transparent substrate, and the photocured layer is formed on another surface of the transparent substrate, wherein information can be recorded on the recording layer with laser light, the recording layer includes a dye having a main absorption band in a wavelength region of 400 nm or less, and the photocured layer is formed by photocuring such that an amount of irradiation by light in the wavelength region of 400 nm or less is less than an amount of irradiation by light in a wavelength region greater than 400 nm.

* * * * *